UNITED STATES PATENT OFFICE.

JOHN B. HALL, OF NEW YORK, N. Y.

IMPROVEMENT IN TREATING PHOTOGRAPHIC PICTURES.

Specification forming part of Letters Patent No. 16,438, dated January 20, 1857.

*To all whom it may concern:*

Be it known that I, JOHN BISHOP HALL, of New York, county or New York, and State of New York, have invented certain new and useful Improvements in the Treatment of Pictures; and I do hereby declare that the following is a full, clear, and exact description of the same—that is to say:

My invention is certain improvements in the production of a high degree of artistic and stereoscopic effect in pictorial representations of objects, and is applicable to all kinds of prints, such as photographs, engravings, lithographs, and similar productions. The principle consists in combining two or more of the photographs, engravings, &c., as the case may be, to form one picture, and which are to be fac-similes or duplicate impressions upon a material semi-transparent or capable of being rendered more or less transparent, according to the effect to be produced. Those pictures are to be so placed above each other that the general lines will coincide when one, both, or all pictures are cemented or secured to a plate or plates of glass. A variety of effects may then be formed, either by coloring, tinting, and shading, by cutting out parts of the back picture, or by all together in differing combinations, the effects being capable of being heightened in many ways. In addition to this a background made of white, light, or reflecting material is placed behind the pictures. White paper, mirrors, or a plate of enameled china produce good effects. These backgrounds may be substituted by painting over the back of the last picture with a white or light color, by silvering it, or by applying quicksilver thereon. These are variations depending on the convenience and taste of the operator. Pictures of all kinds, and especially photographs, are perfectly preserved against decay or deterioration from the action of the atmosphere, and particularly from that of dampness.

I will first illustrate my invention by a description of its employment in the treatment of photographs, to which it is especially applicable.

If the picture is a portrait, two or more copies are to be taken in the usual way upon photographic paper, and I will describe it as applied to two. These pictures are rendered more or less transparent by the application of oil or its equivalent, and each is to be cemented to a separate plate of glass by means of copal or other suitable transparent varnish, which has been previously applied at a time sufficiently in advance for it to become partially dry, or, as is technically termed, "tacky." In applying the picture to the plate of glass care must be taken to work out all the air-bubbles from beneath in order that it may lie in close contact with the glass. Each picture is then allowed to become dry, or nearly so, when it will be well to scrape off the back carefully to remove any excess or lumps, and to leave a smooth surface. After this one or more coats of copal or other suitable varnish is to be given, and when this is dry the two plates of glass are to be joined together, so that the lines of the pictures will coincide, in which position they must be cemented or framed together. When two back pictures are prepared for the combination they may be cemented upon opposite sides of the same plate of glass instead of upon separate plates, as above set forth, or the imprint or photograph may be taken in duplicate upon opposite sides of the same paper or other substance proper for the purpose. These variations, although embracing the same principle, do not for all purposes produce equally good effects with the first-described plan.

The above is a description of the improvement in its simplest form. Different effects may be produced when the front picture only is executed on or attached to the plate of glass and the second one placed behind it, so as to correspond with the other; or, when the front or back pictures are secured between two plates of glass with gum-gomar, balsam of fir, or similar substances remaining in a liquid state, colors may be applied to the back picture only, or partially to both, or so that one color in the front picture may have a ground of another color in the back picture. Very fine effects are produced by cutting out certain parts of the back picture, thus allowing more light to pass to the front one. Additional backgrounds of colors may also be employed, all of which can be determined by the taste and skill of the operator.

It will be seen that the picture is fully preserved from atmospheric agents or effects, the first one being sealed between the glasses, while the back one is protected by the varnish, or that one may also be sealed by cementing an additional plate of glass or other light material over it, and by a frame securing a hermetic joint around it.

In the above paper is specified as the material upon which the imprint should be taken; but there are many other substances which may be employed for that purpose, particularly in the case of photographic pictures. The process may be varied by producing the picture directly upon the glass, either by some system of transfer or printing, or by the photographic art, and like effects still obtained.

I claim—

Producing in pictures to be seen by direct light a high artistic and stereoscopic effect by combining with a white, light, or reflecting background, or its equivalent, two or more identical pictures of the same subject rendered more or less transparent and executed on or attached to plates of glass, in the manner substantially as herein set forth.

JOHN BISHOP HALL.

Witnesses:
J. P. PIKSSON,
J. GURNEY.